(12) United States Patent
Perrin et al.

(10) Patent No.: US 7,752,312 B1
(45) Date of Patent: Jul. 6, 2010

(54) GLOBAL VIEW OF SERVICE AREAS/LOCAL VIEW OF SERVICE NEEDS

(75) Inventors: Stephen Perrin, Chapel Hill, NC (US); Manoj Nair, Cary, NC (US); Iva Blazina Vukelja, Everett, MA (US); John Philip Bell, II, Skibbereen (IE); Alex Rankov, Danville, CA (US)

(73) Assignee: EMC Corporation, Hopkinton, MA (US)

( * ) Notice: Subject to any disclaimer, the term of this patent is extended or adjusted under 35 U.S.C. 154(b) by 441 days.

(21) Appl. No.: 11/692,051

(22) Filed: Mar. 27, 2007

Related U.S. Application Data

(60) Provisional application No. 60/826,072, filed on Sep. 18, 2006, provisional application No. 60/826,073, filed on Sep. 18, 2006, provisional application No. 60/826,053, filed on Sep. 18, 2006, provisional application No. 60/826,074, filed on Sep. 18, 2006, provisional application No. 60/826,042, filed on Sep. 18, 2006.

(51) Int. Cl.
*G06F 15/173* (2006.01)
*G06F 7/00* (2006.01)
*G06F 17/30* (2006.01)

(52) U.S. Cl. .................. 709/226; 709/223; 707/10; 707/200

(58) Field of Classification Search .............. None
See application file for complete search history.

(56) References Cited

U.S. PATENT DOCUMENTS

| | | | |
|---|---|---|---|
| 6,167,445 A | 12/2000 | Gai et al. | |
| 6,308,216 B1 | 10/2001 | Goldszmidt et al. | |
| 6,349,297 B1 | 2/2002 | Shaw et al. | |
| 6,430,613 B1 | 8/2002 | Brunet et al. | |
| 6,591,300 B1 | 7/2003 | Yurkovic | |
| 6,633,312 B1 | 10/2003 | Rochford et al. | |
| 7,185,073 B1 | 2/2007 | Gai et al. | |

(Continued)

FOREIGN PATENT DOCUMENTS

WO    WO 2008/036621    3/2008

OTHER PUBLICATIONS

U.S. Appl. No. 11/528,783, Mail Date Feb. 24, 2009, Office Action.

(Continued)

*Primary Examiner*—Wen-Tai Lin
(74) *Attorney, Agent, or Firm*—Workman Nydegger

(57) ABSTRACT

Methods and systems for providing information management services to data objects at both global and local levels. The computer system includes an information management server for providing customized services to the data objects. One exemplary method identifies data objects that have been divided into logical groups within a computer system. A first and second set of information management rules are also identified, where the first set of information management rules has been associated with one of the logical groups. The first set of information management rules is applied to the data objects located within the logical group associated with the first set of information management rules, and the second set of information management rules is applied to all of the data objects in all of the logical groups. The second set of information management rules may include global service areas and levels that are offered by the information management server.

20 Claims, 7 Drawing Sheets

U.S. PATENT DOCUMENTS

| | | | |
|---|---|---|---|
| 7,363,292 | B2 | 4/2008 | Chaboche |
| 7,613,806 | B2 | 11/2009 | Wright et al. |
| 2002/0016800 | A1 | 2/2002 | Spivak et al. |
| 2002/0161883 | A1 | 10/2002 | Matheny et al. |
| 2003/0023587 | A1* | 1/2003 | Dennis et al. ............... 707/3 |
| 2003/0023712 | A1 | 1/2003 | Zhao et al. |
| 2003/0041050 | A1 | 2/2003 | Smith et al. |
| 2003/0093528 | A1 | 5/2003 | Rolia |
| 2003/0167180 | A1 | 9/2003 | Chung et al. |
| 2003/0196108 | A1 | 10/2003 | Kung |
| 2003/0212778 | A1 | 11/2003 | Collomb |
| 2003/0233391 | A1 | 12/2003 | Crawford et al. |
| 2004/0215650 | A1* | 10/2004 | Shaji et al. ............... 707/102 |
| 2005/0071182 | A1 | 3/2005 | Aikens et al. |
| 2005/0125768 | A1 | 6/2005 | Wong et al. |
| 2005/0131982 | A1* | 6/2005 | Yamasaki et al. ........... 709/200 |
| 2005/0132034 | A1 | 6/2005 | Iglesia et al. |
| 2005/0197852 | A1 | 9/2005 | Gebhard et al. |
| 2005/0262097 | A1* | 11/2005 | Sim-Tang et al. ........... 707/10 |
| 2006/0092861 | A1 | 5/2006 | Corday et al. |
| 2006/0095543 | A1 | 5/2006 | Ito et al. |
| 2006/0101084 | A1* | 5/2006 | Kishi et al. ............... 707/200 |
| 2006/0106782 | A1 | 5/2006 | Blumenau et al. |
| 2006/0112108 | A1 | 5/2006 | Eklund et al. |
| 2006/0236061 | A1 | 10/2006 | Koclanes |
| 2006/0248187 | A1 | 11/2006 | Thorpe et al. |
| 2007/0055689 | A1 | 3/2007 | Rhoads et al. |
| 2007/0058632 | A1 | 3/2007 | Back et al. |
| 2007/0061363 | A1 | 3/2007 | Ramer et al. |
| 2007/0103984 | A1 | 5/2007 | Kavuri et al. |
| 2007/0192352 | A1 | 8/2007 | Levy |
| 2007/0208751 | A1 | 9/2007 | Cowan et al. |
| 2007/0226228 | A1 | 9/2007 | Her et al. |
| 2008/0049642 | A1 | 2/2008 | Gudipudi et al. |
| 2008/0071726 | A1 | 3/2008 | Nair et al. |
| 2008/0071727 | A1 | 3/2008 | Nair et al. |
| 2008/0071813 | A1 | 3/2008 | Nair et al. |
| 2008/0071908 | A1 | 3/2008 | Nair et al. |
| 2008/0077682 | A1 | 3/2008 | Nair et al. |
| 2008/0077995 | A1 | 3/2008 | Curnyn et al. |
| 2008/0114725 | A1 | 5/2008 | Indeck et al. |
| 2008/0177994 | A1 | 7/2008 | Mayer |
| 2009/0157881 | A1* | 6/2009 | Kavuri et al. ............... 709/226 |

OTHER PUBLICATIONS

U.S. Appl. No. 11/528,898, Mail Date Feb. 9, 2009, First Action Interview.
U.S. Appl. No. 11/528,898, Mail Date Apr. 3, 2009, Office Action.
U.S. Appl. No. 11/528,900, Mail Date Jan. 23, 2009, Final Office Action.
U.S. Appl. No. 11/694,753, Mail Date Mar. 25, 2009, Office Action.
U.S. Appl. No. 11/694,783, Mail Date Feb. 6, 2009, Office Action.
U.S. Appl. No. 11/692,058, filed Mar. 27, 2007, Perrin et al.
U.S. Appl. No. 11/694,753, filed Mar. 30, 2007, Nair et al.
U.S. Appl. No. 11/694,764, filed Mar. 30, 2007, Nair et al.
U.S. Appl. No. 11/694,783, filed Mar. 30, 2007, Perrin et al.
U.S. Appl. No. 11/772,179, filed Jun. 30, 2007, John Philip Bell, II.
U.S. Appl. No. 11/772,192, filed Jun. 30, 2007, Nair et al.
U.S. Appl. No. 11/528,900, Mail Date Jun. 9, 2008, Office Action.
U.S. Appl. No. 11/528,772, Mail Date Sep. 12, 2008, Pre-Interview First Office Action.
U.S. Appl. No. 11/528,783, Mail Date Nov. 7, 2008, Pre-Interview First Office Action.
U.S. Appl. No. 11/528,898, Mail Date Sep. 5, 2008, Pre-Interview First Office Action.
U.S. Appl. No. 11/528,772, Mail Date Jun. 3, 2009, Final Office Action.
U.S. Appl. No. 11/528,783, Mail Date Jun. 25, 2009, Final Office Action.
U.S. Appl. No. 11/528,900, Mail Date Aug. 25, 2009, Notice of Allowance.
U.S. Appl. No. 11/692,058, Mail Date Jul. 9, 2009, Office Action.
U.S. Appl. No. 11/772,179, Mail Date Aug. 19, 2009, Office Action.
U.S. Appl. No. 11/528,898, Mail Date Oct. 7, 2009, Final Office Action.
U.S. Appl. No. 11/694,753, Mail Date Nov. 18, 2009, Final Office Action.
U.S. Appl. No. 11/864,596, filed Sep. 28, 2007, Nair et al.
U.S. Appl. No. 11/864,605, filed Sep. 28, 2007, Nair et al.
U.S. Appl. No. 11/864,760, filed Sep. 28, 2007, Nair et al.
U.S. Appl. No. 11/864,764, filed Sep. 28, 2007, Nair et al.
U.S. Appl. No. 11/864,770, filed Sep. 28, 2007, Nair et al.
U.S. Appl. No. 11/864,774, filed Sep. 28, 2007, Nair et al.
U.S. Appl. No. 11/528,783, filed Jan. 15, 2010, Office Action.
U.S. Appl. No. 11/528,772, filed Jan. 28, 2010, Office Action.
U.S. Appl. No. 11/692,058, filed Jan. 8, 2010, Final Office Action.
U.S. Appl. No. 11/864,596, filed Nov. 12, 2009, Office Action.
U.S. Appl. No. 11/694,764, filed Jan. 28, 2010, Office Action.
U.S. Appl. No. 11/772,179, filed Feb. 23, 2010, Final Office Action.
U.S. Appl. No. 11/864,770, filed Nov. 27, 2009, Office Action.
U.S. Appl. No. 11/864,760, filed Nov. 24, 2009, Office Action.
U.S. Appl. No. 11/864,605, filed Jan. 14, 2010, Office Action.
U.S. Appl. No. 11/694,753, filed Mar. 29, 2010, Office Action
U.S. Appl. No. 11/864,770, filed Apr. 21, 2010, Final Office Action.
U.S. Appl. No. 11/772,192, filed Apr. 15, 2010, Office Action.
U.S. Appl. No. 11/864,760, filed Apr. 7, 2010, Final Office Action.

* cited by examiner

GLOBAL VIEW OF SERVICE AREAS/LOCAL VIEW OF SERVICE NEEDS

CROSS-REFERENCE TO RELATED APPLICATIONS

This application claims the benefit of:

U.S. Provisional Application Ser. No. 60/826,072, filed Sep. 18, 2006 and entitled "INFORMATION MANAGEMENT";

U.S. Provisional Application Ser. No. 60/826,073, filed Sep. 18, 2006 and entitled "CASCADED DISCOVERY OF INFORMATION ENVIRONMENT";

U.S. Provisional Application Ser. No. 60/826,053, filed Sep. 18, 2006, entitled "ENVIRONMENT CLASSIFICATION";

U.S. Provisional Application Ser. No. 60/826,074, filed Sep. 18, 2006 and entitled "INFORMATION CLASSIFICATION"; and U.S. Provisional Application No. 60/826,042, filed Sep. 18, 2006, entitled "SERVICE LEVEL MAPPING METHOD";

which applications are incorporated herein by reference in their entirety.

BACKGROUND

1. The Field of the Invention

The present invention relates generally to information management services. More specifically, the present invention relates to methods and systems for applying information management services to data objects within a computer system on both global and local levels.

2. The Relevant Technology

Modern computer systems allow for the interchange of data and resources through network environments. For example, a modern computer network may include a number of interconnected client computers. The computer network may further include resources. Such resources may be, for example and not limited to, file servers for storing data accessible by the clients, print servers for providing access to printers to the clients, and shared stores on client computers for storing data to be made available to other clients and resources on the network.

In this society where many personal and business interactions are data driven, the ability to provide protection, retention, recovery, security, and other services to data have become important features of computer networks. Establishing a system to provide these services can be costly, both in terms of the equipment and applications necessary to perform the services and particularly in terms of the time required to configure and manage the system. As the amount of data stored by a system increases and the storage systems become more complex, the ability to customize the services provided to each data file is of greater importance.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
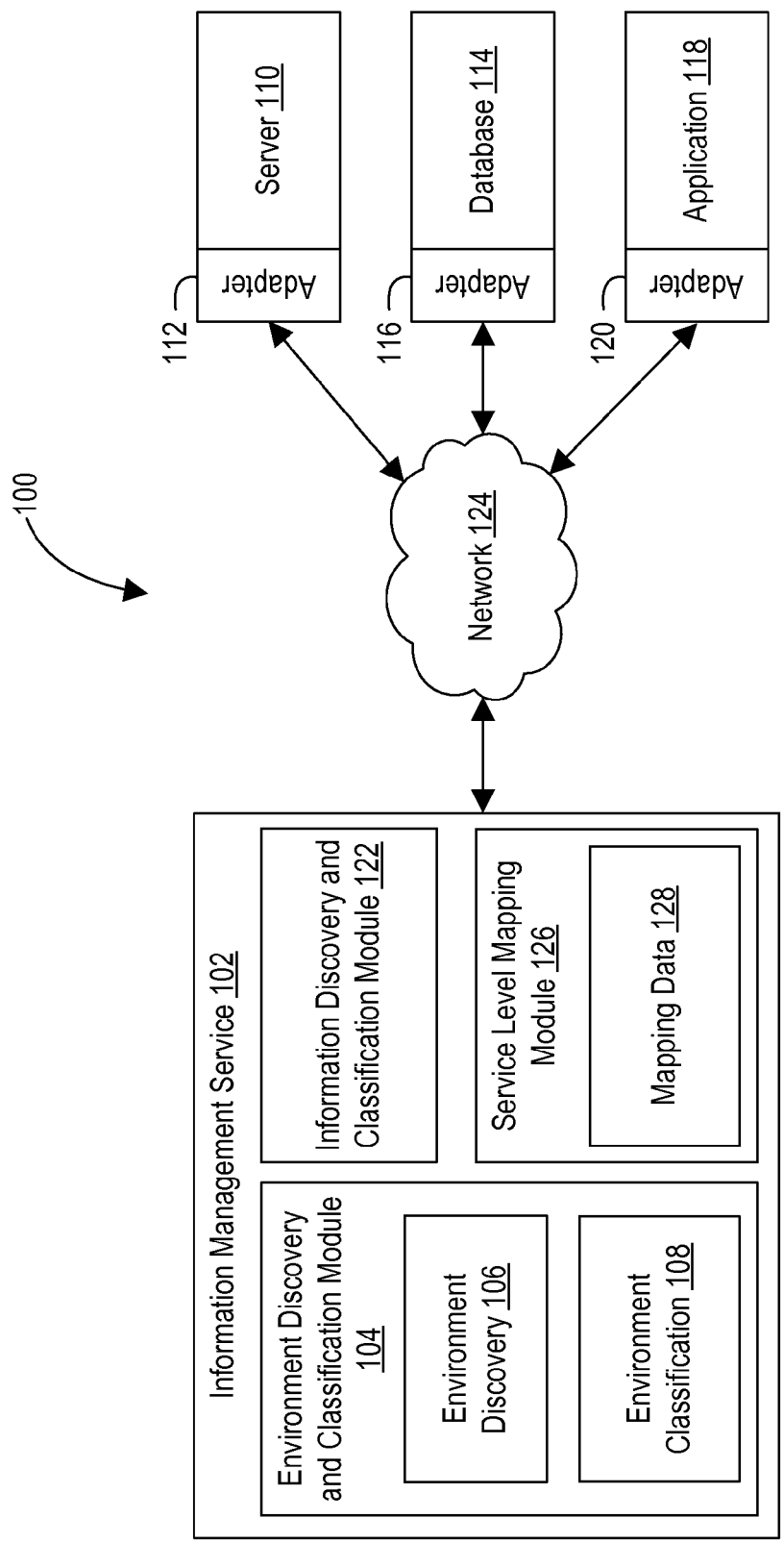
FIG. 1 illustrates a computer system having an information management service configured for classifying the environment components of the computer system, in accordance with the present invention.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Embodiments of the present invention relate to methods and systems for providing information management services to data objects stored within a computer system on both global and local levels. The computer system includes an information management server for providing customized services to data objects residing in the computer system. One exemplary method provides services to data objects that are divided into logical groups. The services that are offered to the logical groups are defined by a global set of service levels. The global set of service levels may include, for example, the services that a data center is capable of providing to its customers. Although the global set of service levels is applicable to all logical groups, the present invention allows each logical group to request a unique set of service level objectives, independent of the service level objectives requested by the other logical groups. Therefore, the invention provides a global view of service areas, while allowing local selection of service levels.

In another embodiment, the systems and methods of the present invention identify data objects that have been divided into logical groups within a computer system. A first and second set of information management rules are also identified, where the first set of information management rules has been associated with one of the logical groups. The first set of information management rules is applied to the data objects located within the logical group associated with the first set of information management rules for defining the information management services to be provided to the data objects located in the logical group associated with the first set rules. The second set of information management rules is applied to all of the data objects in all of the logical groups for defining the information management services to be provided to all of the data objects located in the computer system.

As used herein, the terms "data" and "data object" may include, but are not limited to, files, directories (e.g., volumes, file systems, and the like), user data, system data, applications, services, operating systems, instructions, and the like, that can be stored on one or more storage devices. Backing up or recovering the data may include backing up or recovering any of the data herein defined or understood by those of skill in the art. Data may be organized in logical directories that do not necessarily correspond to a particular storage device. The term "directory" can be used interchangeably with the term "volume" or "file system" to refer to any means of logically organizing data on a computer.

Certain embodiments described herein will involve electronic communication between a client computer system (hereinafter referred to as a "client") requesting access to a network service at a server computer system (hereinafter referred to as a "server"). Accordingly, the client sends a request to the server for particular access to its system resources, wherein if the client is authorized and validated, the server responds with a response message providing the desired information. Of course, other messaging patterns between client and server are available, as are well known in the art.

It should be appreciated that the present invention can be implemented in numerous ways, including as a process, an apparatus, a system, a device, a method, or a computer-readable medium such as a computer-readable storage medium or a computer network wherein program instructions are sent over optical or electronic communication links. A general purpose computer system such as an Intel-based processor running Microsoft Windows or Linux may be used, or a specialized appliance may be used.

1. Introduction to Information Management Services

Embodiments of the invention relate to information or data management. Information management enables the orchestration of services such as data protection, data placement, corporate compliance, and others based on the needs of the underlying data and the value of the data to the owner of the data. Embodiments of the invention enable the data to be classified in an automated fashion and provides various levels of granularity that can be adjusted as needed. Using the techniques described herein, an entity can be assured that its data is receiving the services that are actually required. The following introduction provides context for the present invention, which focuses on service level mapping used for facilitating the orchestration of customized service levels.

Referring to FIG. 1, a computer system 100 is illustrated having various environment components, including a server 110, a database 114, and an application 118. The computer system 100 may include a single computer, a local area network (LAN), metropolitan area networks (MAN), a wide area network (WAN), and the like and combinations thereof. The environment components 110, 114 and 118 and the information management service 102 may be located a locally or at a remote location in relation to the clients utilizing the information management service 102.

An information management service 102 may be configured to provide various services, including but not limited to, an information discovery and classification module 122, an environment discovery and classification module 104, a service level mapping module 126, and the like. The information residing in the computer system 100 is discovered and classified by the information discovery and classification module 122. The environment components 110, 114 and 118 that exist within the computer system 100 are discovered and classified by the environment discovery and classification module 104. The service level mapping module 126 is then used for matching the discovered data objects to their service needs, and for the matching their service needs to the appropriate service provider (i.e., environment component) that is capable of providing those needs. Each of the modules 104, 122 and 126 will be described in further detail below, with particular emphasis placed on the service level mapping module 126.

As described previously, the environment discovery and classification module 104 is provided for discovering and for classifying the environment components 110, 114, and 118 that exist within the computer system 100. Although only three environment components are illustrated in FIG. 1, more or less environment components may exist within the computer system 100.

The environment components 110, 114, and 118 may provide a variety of services to the computer system 100 and to the data residing therein. For example, the server 110 may act as a storage server, retention server, data migration server, backup server, recovery server, data protection server, and the like or any combination thereof. The database 114, for example, may act as an exchange database, a payroll database, and the like or any combination thereof. The application 118 may include, for example, a data indexer, a data miner, a data transport, a security application, and the like or any combination thereof a. Information Discovery and Classification A large variety of data objects may be stored within the computer system 100. The data objects may be discovered by the information discovery and classification module 122. The discovered data objects may have a variety of service needs. The service level objectives requested by a data object may be characterized by set of a service areas and a set of service levels. Service areas include generalized areas of service that may be performed on a data object, including data protection (e.g., frequency of backup, redundancy of data, and the like), data retention, data security (e.g., encryption, access control, and the like), data migration, data indexing, and the like. Service levels define the extent at which a service area is provided to the data object. For example, a service area may include data backup. Data backup may include various service levels, including an hourly backup, a daily backup, a weekly backup, a monthly backup, and the like.

The services required by each of the data objects may be imposed by the system administrator, governmental standards and regulations, company guidelines, and the like or any combination thereof. A single data object typically requires multiple services from more than one service area. The combination of services requested by a single data object is referred to herein as a "target service package."

A large computer system, such as an enterprise network, may include a large variety of data objects having various unique properties. Consequently, the data objects within a computer system may also request many different service level objectives. By way of example, certain data objects must be retained for one year, while other types of data objects must be retained indefinitely. Likewise, certain data objects must be indexed, while indexing is not necessary or may be overly expensive or may waste valuable resources when performed for other types of data objects. In addition, certain data objects must be saved to a backup location at least once per day, while other types of data objects only need to be saved to the backup location once every week. Within a company or enterprise network, documents created by one division within the company may require a higher level of service than documents created by another division within the company. Furthermore, documents containing predefined words, phrases, or data patterns may require higher levels of service than other types of documents. Other examples of differing service areas and differing service levels required by data within the system will also be evident to one of ordinary skill in the art.

In order to efficiently determine the service level objectives of each data object residing in the computer system 100, the data objects may be classified using the information discovery and classification module 122. In general, the information discovery and classification module 122 may perform an automated classification process, which may classify the data objects in accordance with a predefined set of rules. The data objects may be classified based on a number of factors, including the content contained within each data object, the organization, group or individual that created the data object, the metadata associated with each data object, and the like and any combination thereof. The metadata may be used to determine the date of last use of the data object, owner of the data object, date of creation, file size, file type, disposition date, content of the object, and the like.

b. Environment Discovery and Classification

Environment components 110, 114, or 118 are often limited as to the service areas and service levels that they are capable of providing. For example, the server 110 may be capable of providing a low level of security services for certain data files that do not require a high level of security, but the server 110 may be incapable of providing high level security services to highly confidential files. Therefore, it may be advantageous to classify the environment components in accordance with the service areas and service levels that each environment component is capable of providing.

Classifying the environment of the computer system 100 may be performed by the environment discovery and classification module 104 as a two step process. First, the system environment is discovered, and second, the discovered environment components are classified in accordance with their service level capabilities. In general, the environment discovery module 106 may create a detailed diagram of each environment component 110, 114, 118 contained within the computer system 100, as well as the manner in which each environment component interfaces with the other environment components and subsystems within the computer system 100. In order to create a detailed diagram, the environment discovery module 104 may rely on adapters 112, 116, and 120 that are specifically configured to communicate with and gather information from specific environment components 110, 114, and 118, respectively.

In order to classify the environment components 110, 114 and 118, the environment classification module 108 first identifies the environment components compiled by the environment discovery module 106. The environment classification module 108 analyzes the system environment data 106 in order to identify the service level capabilities of the environment components 110, 114 and 118. As described previously, the service level capabilities include the service areas and service levels that each of the environment components 110, 114 and 118 is able to provide to the data objects and other environment components located within the computer system 100.

The environment classification module 108 can then classify the environment components based on their service level capabilities. For example, a first backup server may provide a particular class of information protection service, such as daily backups, and a second backup server may provide a different class of information protection service, such as continuous data protection (CDP).

In one embodiment, storage locations are classified based on the service levels that can be provided to the data objects stored at each of the storage locations. In some instances, the services that can be provided to data objects are location-dependant. In other words, the services that are available in a computer system can often only be performed if a data object is located at a specific location. In another embodiment, storage locations are classified based on the data protection services that the storage location requires in order to provide sufficient protection to the data objects it contains. In another embodiment, environment components are classified based on the locations within the computer system that the service applications are capable of providing services to.

b. Service Level Mapping

Once the system environment and the data objects residing in the system have been discovered and classified, the service level mapping module 126 can perform the tasks of selecting service level objectives for each data object and selecting service packages and service providers that are capable of providing the service level objectives.

Figure 2:
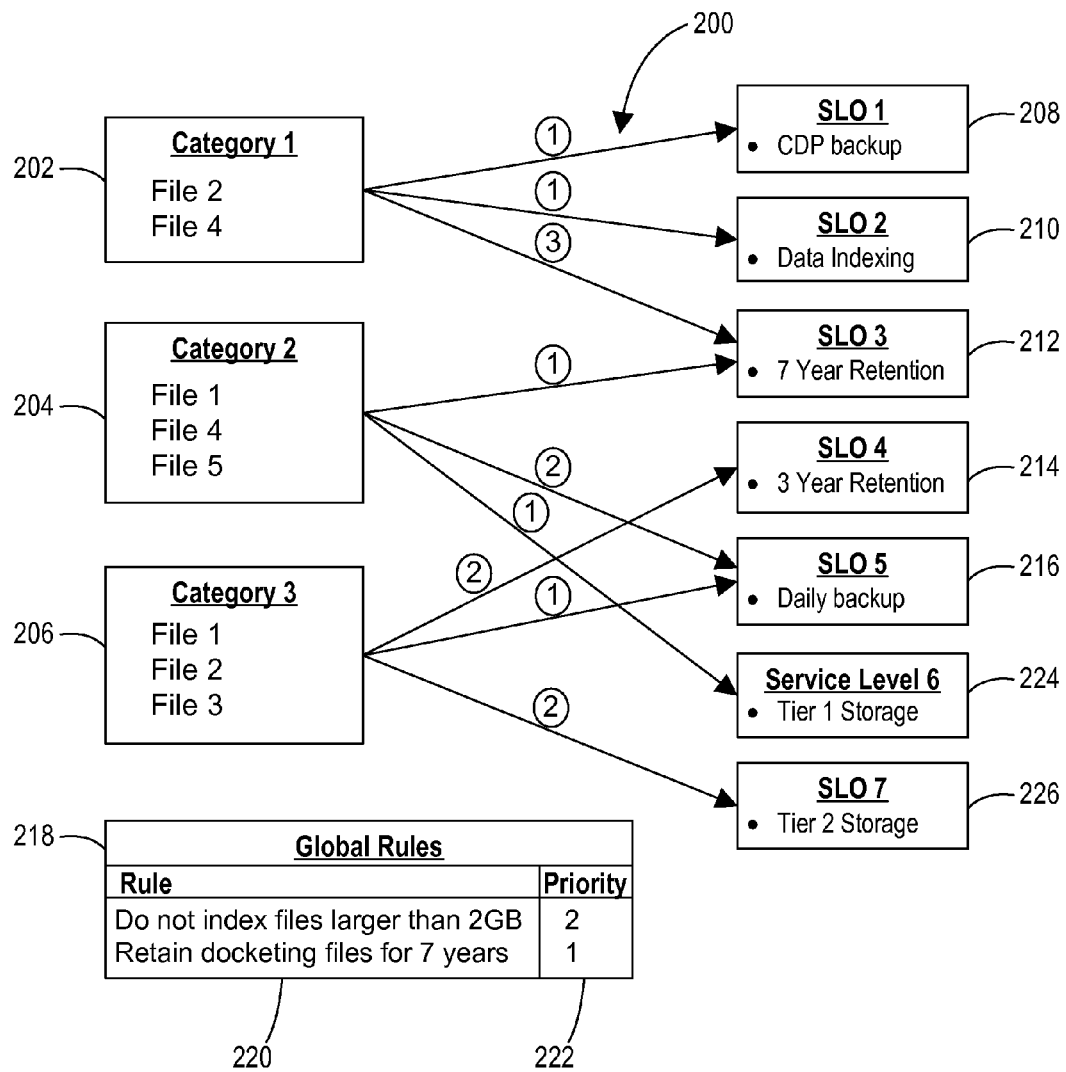
FIG. 2 illustrates an exemplary service level mapping of categories to service level objectives, in accordance with the present invention.

FIG. 2 provides an illustration of an exemplary service level mapping scheme 200 that may be employed by the service level mapping module 126 for matching each data object (i.e., Files 1-5) to the appropriate service level objectives (i.e., Service level objectives 1-7). As illustrated in FIG. 2, the files may be categorized into Categories 1-3 (202, 204 and 206), in accordance with properties associated with the files. By way of example, the first category 202 may include files that originated from a division within a company, such as accounting. The second category 204 may include files that exceed two gigabytes in size. The third category 206 may include files whose content includes private information, such as the social security numbers of customers of the company. The categorization of the files into the categories 202, 204 and 206 may be performed by the information discovery and classification module 122, as described previously.

A variety of different service level objectives may be offered to the files contained within the categories 202, 204 and 206. By way of example, the service level objectives that may be offered to the categories 202, 204 and 206 may include CDP backup 208, where every change to the data object is recorded in the CDP engine, data indexing 210, where the content of each file is indexed, seven year retention 212, where the data is stored for at least seven years prior to deletion, three year retention 214, where the data is stored for least three years prior to deletion, daily backup 216, where the files are stored to a backup location on a daily basis, tier 1 storage 224, tier 2 storage 226, and the like. As will be appreciated by one of ordinary skill in the art, many other service level objectives may be offered in addition to those illustrated in FIG. 2.

After assessing the categories 202, 204 and 206 and the available service level objectives 208, 210, 212, 214, 216, 224 and 226, the service level mapping module 126 maps each of the categories to one or more service level objectives for defining the types of services that will be requested by each category. The mappings are depicted by the arrows drawn from the categories 202, 204 and 206 to the service level objectives 208, 210, 212, 214, 216, 224 and 226. For example, Category 1 (202) is mapped to the CDP backup 208, data indexing 210 and seven year retention 212 service level objectives. Category 2 (204) is mapped to the seven year retention 212, daily backup 216 and tier 1 storage 224 service level objectives. Category 3 (206) is mapped to the three year retention 214, daily backup 216 and tier 2 storage 226 service level objectives. The generated service level mappings between the categories 202, 204 and 206 and the service level objectives 208, 210, 212, 214, 216, 224 and 226 may be stored, for example, in the form of metadata, in the mapping data structure 128.

As illustrated in FIG. 2, a single file may be included in multiple categories. For example, 'File 1' is included both in Category 2 (204) and in Category 3 (206). Therefore, 'File 1' will receive the services requested by both Category 2 (204) and by Category 3 (206). Because conflicts may arise when a file is included in multiple categories, the mappings from the categories to the service level objectives may be prioritized in order to resolve any conflicts that may arise, as is described in further detail below.

In one embodiment, priorities may be assigned to each of the service level mappings between the categories 202, 204 and 206 and the service level objectives 208, 210, 212, 214, 216, 224 and 226. The priorities may be used in order to resolve any conflicts that may arise between the various service level objectives that may be requested by a single file. In the example illustrated in FIG. 2, the priority levels are positioned adjacent to the arrows representing the service level mappings from the categories 202, 204 and 206 to the service level objectives 208, 210, 212, 214, 216, 224 and 226.

Figure 3:
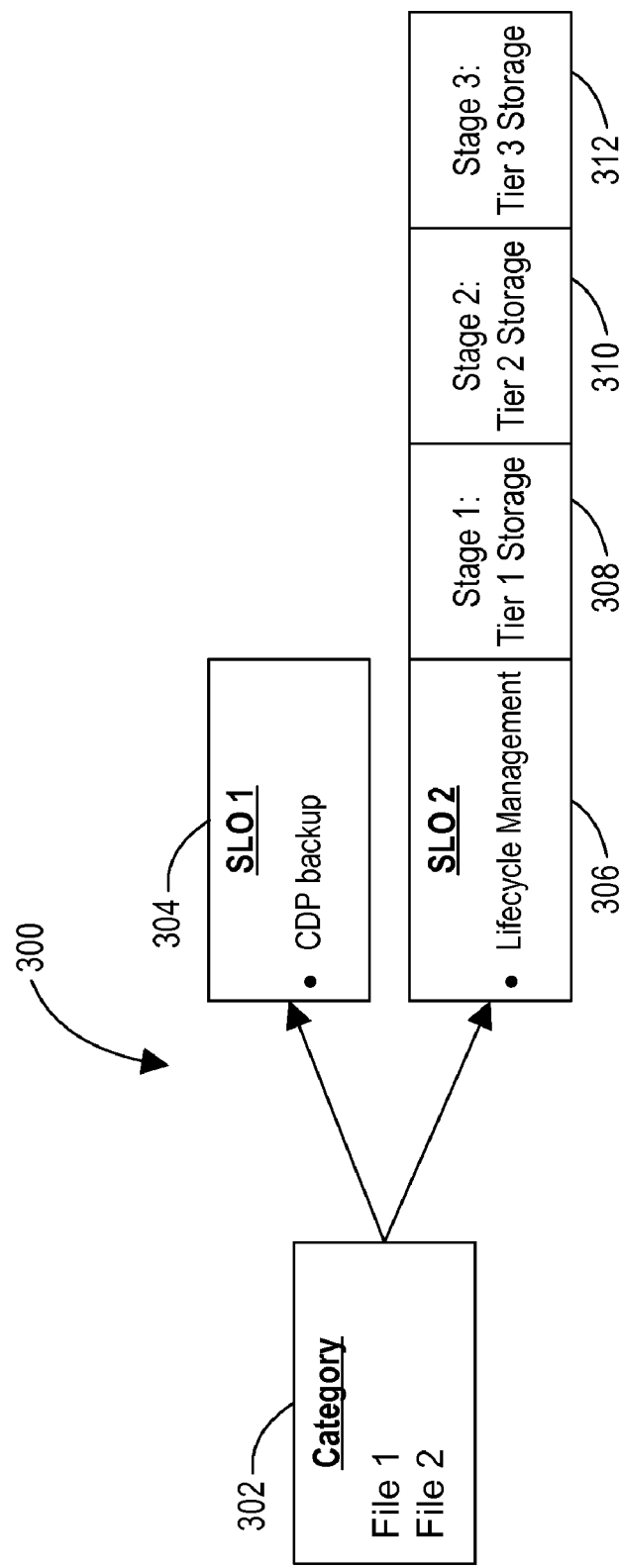
FIG. 3 illustrates an exemplary service level mapping where an category is mapped to a lifecycle management service, in accordance with the present invention.

FIG. 3 is another exemplary illustration of a service level mapping scheme 300 where the category 302 is mapped to a lifecycle management service level 306. The data object or category may be mapped to the lifecycle management service level 306 when the storage location of the data objects is dependent on aging properties associated with those data objects. When a data object or category is mapped to the lifecycle management service level 306, the aging properties of the data object are analyzed prior to selecting the actual service level that will be applied to the data objects. The aging properties that may be analyzed may include any property that may be relevant to the determination of the service level that should be applied to that file, including but not limited to, the amount of time since the data object was created, the amount of time since the data object was last accessed, the amount of time since the data object was last modified, the frequency at which the data object is accessed or modified, and the like and combinations thereof.

Figure 4:
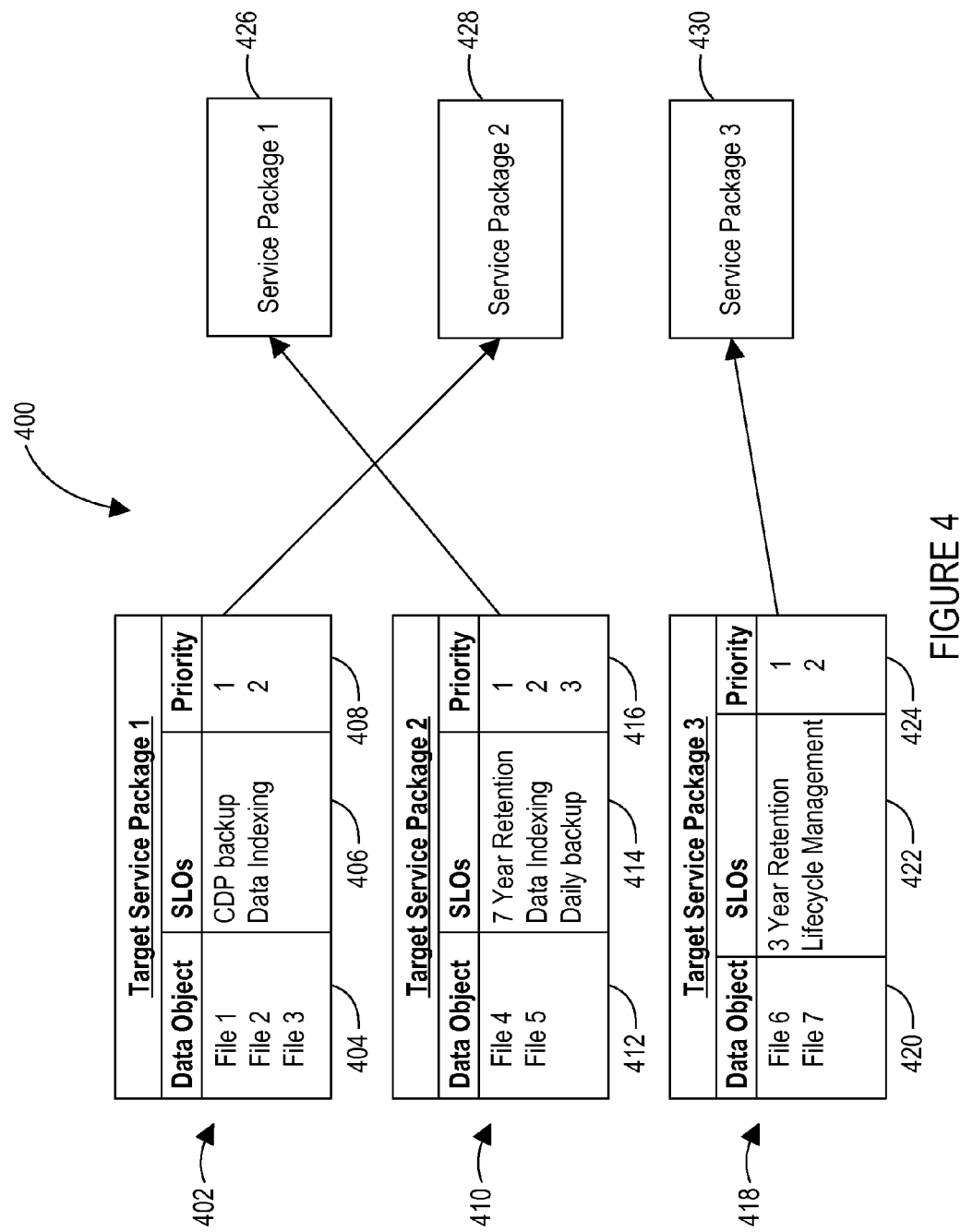
FIG. 4 illustrates exemplary mappings of target service packages to service providers and service packages that are capable of providing the requested service level objectives, in accordance with the present invention.

After performing service level mapping to select the service level objectives for each category 202, 204 and 206, as illustrated in FIG. 2, the service level mapping module 126 maps each of the target service packages to one or more service packages offered by the data center that are most capable of providing the service level objectives contained in the target service packages, as illustrated in FIG. 4. FIG. 4 consists of "target service packages" 402, 410 and 418 on the left and "service packages" 426, 428 and 430 on the right. The "target service packages" 402, 410 and 418 consist of groups of files 404, 412, and 420 that have requests common service level objectives 406, 414 and 422. The "service packages" 426, 428 and 430 consist of the actual bundles of services that are offered by a data center. In some embodiments, the "service packages" provided by a data center may not be able to provide every combination of service level objectives contained in the "target service packages", due to the limited number of "service packages" provided by the data center. FIG. 4 illustrates an exemplary mapping of the target service packages 402, 410 and 418 to a service provider 426, 428 and 430 that is most capable of providing the service level objectives 406, 414 and 422 contained within the target service packages.

Each target service package 402, 410 and 418 may be associated with multiple files, wherein all files contained within a single service package have requested the same group of service level objectives 406, 414 and 422. For example, the target service package 402 includes 'File 1', 'File 2' and 'File 3' (404), each of which has requested CDP backup and data indexing 406. The service level objectives 406, 414 and 422 included within each of the target service packages 402, 410 and 418, respectively, are provided by way of example, and do not necessarily reflect the service level mappings 200 illustrated in FIG. 2.

The service packages 426, 428 and 430 may include a bundle of services offered by one or more environment components to the data objects stored within the computer system. The number of service packages 426, 428 and 430 and the combination of services they each provide may be determined by a data center that specializes in information management services. The services contained in each of the service packages 426, 428 and 430 illustrated in FIG. 4 may be provided by multiple environment components that, taken together, are capable of providing all of the service is included within a service package.

The service level mapping module 126 maps each target service package 402, 410 and 418 to one or more service packages 426, 428 and 430 that are best able to provide the service level objectives 406, 414 and 422 of each of the service packages. In one embodiment, the service providers that provide the services offered in the service packages 426, 428 and 430 include environment components that have been classified in accordance with the environment classification techniques provided by the environment discovery and classification module 104 of FIG. 1.

In one embodiment, the service packages 426, 428 and 430 offered by the data center are sufficient in number to provide any combination of service level objectives 406, 414 and 422 that may exist. In this case, the step of mapping target service packages 402, 410 and 418 to the offered service packages 426, 428 and 430 may be unnecessary, and the target service packages may be mapped directly to the service providers capable of providing the necessary service level objectives 406, 414 and 422. However, in another embodiment, only a finite number of service packages 426, 428 and 430 are offered by the data center. Therefore, in some circumstances, the service packages 426, 428 and 430 offered by the data center may not be able to provide every combination of service level objectives 406, 414 and 422 contained in the target service packages 402, 410 and 418. In this embodiment, user configurable logic may be employed for determining which of the service level objectives 406, 414, and 422 to retain in the event that the data center has elected not to offer service packages that exactly match the target service packages 402, 410 and 418, such as a prioritization scheme illustrated by priority levels 408, 416 and 424.

2. Global and Local Views of Information Management Services

Figure 5:
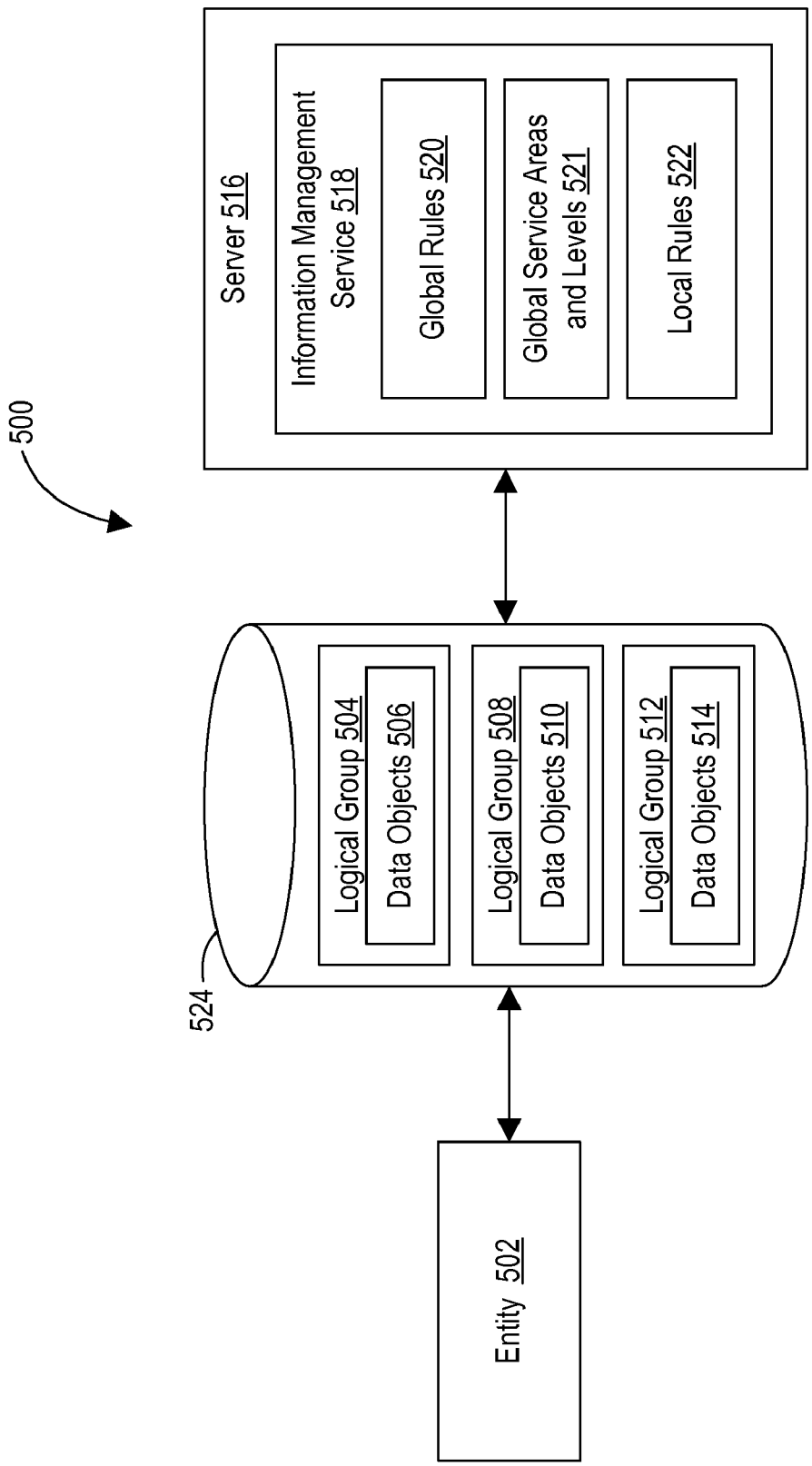
FIG. 5 illustrates an exemplary system for applying information management services to data objects on both global and local levels.

FIG. 5 illustrates an exemplary environment for providing global and local service levels to an entity's information. An entity 502 may consist of an individual, a group of individuals, a company, an organization, a school, a city or municipality, and the like or any combination thereof. A storage location 524 is used by the entity 502 to store data objects 506, 510 and 514, i.e., files, email, data structures, and the like. The storage location 524 may actually include any number of separate storage servers, retention servers, backup servers, and the like or any combination thereof.

The data objects 506, 510 and 514 belonging to a single entity 502 may be divided into one or more logical groups 504, 508 and 512, respectively. The logical groups 504, 508 and 512 may include, for example, departments or "lines of business" within an entity. An engineering firm that performs contract work for the government, for instance, often has data that is associated with the engineering being performed. At the same time, the engineering firm may also have data that is associated with the legal department or corporate aspect of the engineering firm, data that is associated with human resources, data that is associated with accounting, and the like. In other words, a given entity often has various domains of data or different shares of data, some of which may be shared by the various lines of business. These domains, shares, or lines of business are referred to herein as "logical groups" 504, 508 and 512.

Each logical group 504, 508 and 512 may include one or more data objects 506, 510 and 514, respectively. The data objects 506, 510 and 514 within each logical group 504, 508 and 512 may be categorized into categories in accordance with the techniques described in FIGS. 1-3.

The services that are offered to the logical groups 504, 508 and 512 may be managed by an information management server 516. The information management server 516 may be provided by a data center that is responsible for providing a variety of services to one or more entities 502. As will be described in further detail below, the service level objectives that are requested by the data objects 506, 510 and 514 may vary between each logical group 504, 508 and 512. However, the service levels that are offered to the data objects 506, 510 and 514 may be global in nature, meaning that they are the same for all data objects, regardless of which logical group 504, 508 and 512 the data objects belong to. In the FIG. 5 example, the global services that are available to all of the logical groups 504, 508 and 512 are shown as "global service areas and levels" 521.

The global service areas and levels 521 may be defined in various ways. In one embodiment, an administrator for the server 516 defines the global service areas and levels 521 that will be provided. For example, an administrator may make a business decision to provide a limited number of global service options to all of the customers using the server 516. The global service areas and levels 521 may include the service combinations that are most commonly requested by customers. By providing a limited number of global service options, a data center is able to provide high quality services to a large number of clients, while minimizing the complications that arise by offering a large variety of services.

In another embodiment, the global service levels 521 are at least partially defined by the physical and/or computational limitations of the server 516. For example, a data center, acting as server 516, may have the capability to provide hourly, daily, and weekly backup, but may not have a CDP engine for providing continuous data protection. Similarly, the data center may be capable of providing low and medium levels of data security, but may not have software capable of providing a high level of data security. Each of these limitations is inherently part of the global service areas and levels 521 that are offered by the server 516.

Although the service levels and areas offered by the server 516 may be global in nature, the present invention allows for the local selection of service rules and service level objectives by each of the logical groups. Within each logical group of 504, 508 and 512, there are often data objects 506, 510 and 514 that may be subject to certain requirements that are different from requirements that exist with respect to data in the other logical groups. For example, perhaps the engineering group requires their files to be backed up on an hourly basis, while the accounting group only requires their files to be backed up on a daily basis. Similarly, a human resources group may require that their files be indexed, while the other files within an entity do not need to be indexed.

In order to provide each logical group 504, 508 and 512 with customized service levels, the information management service 518 may include local rules 522 which are meant to be applied to an individual logic group 504, 508 or 512. The local rules 522 may include a variety of instructions, including classification rules for classifying the data objects 506, 510 and 514 and the environment components that are under the control of the logic group 504, 508 or 512, service level mappings for defining service areas and service levels to be applied to the data objects, rules for mapping target service packages to the service providers that are capable of providing the requested services, storage locations and storage policies for the data objects, and the like or any combination thereof.

By applying a local rule set to one of the logical groups, 504, 508 or 512, the services provided to the corresponding data objects 506, 510 or 514 can be controlled in accordance with the needs of each individual logical group. The local rules 522 may be provided, for example, by an administrator of the logical group 504, 508 or 512 associated with the local rule, such as an IT administrator or other personnel within the department having control over the data stored by the department.

Although the local rules 520 may be customized to meet the requests of each individual logical group 504, 508 and 512, other service policies may also be applied in a global manner, i.e., to all the data objects 506, 510 and 514 within all the logical groups. The services that are applied to all logical groups 504, 508 and 512 are referred to as global rules 520. Global rules 520 are not to be confused with the global service areas and levels 521. While the global service areas and levels 521 define the scope of the services that are offered to the logical groups 504, 508, and 512, the global rules 520 may include a selection of one or more rules that will be applied to all logical groups 504, 508, and 512 within an entity 502. For example, the global service areas and levels 521 may provide ten different service levels that can be selected. The global rules 520 may specify that one of these service levels should be applied to all of the data objects, regardless of which logical group 504, 508, and 512 the data objects are contained in.

The global rules 520 may include a variety of instructions, including classification rules for classifying the data objects 506, 510 and 514 and the environment components of the system 500, service level mappings for defining service areas and service levels to be applied to all data objects, rules for mapping target service packages to the service providers and service packages that are capable of providing the requested services, storage locations and storage policies for the data objects, and the like, or any combination thereof.

Global rules 520 may include rules specified by an administrator of the entire entity 502. In this case, the global rules 520 may include information management service policies that cannot vary between each logical group 504, 508 and 512. For instance, a company policy that all files, regardless of which line of business or department, must be screened for viruses on a weekly basis, could be included within the global rules 520.

The global rules 520 may also be specified by a compliance officer, either from within the entity 502 or a third party. For example, the corporate officer may require that all files containing social security numbers be retained for a period of seven years for governmental regulations, regardless of which logical group 504, 508 or 512 contains the files.

The global rules 520 may also be specified by a security officer, either from within the entity 502 or a third party. For example, the security officer may require that all data objects containing financial records be subject to certain to security access requirements, regardless of which logical group 504, 508 or 512 contains the data object.

In addition to managing the execution of the global and local rules 520 and 522, the information management service 518 may also possess any of the other abilities described herein for providing customized services to the system 500.

In one embodiment, the storage location(s) 504, the information management service 518 and/or the other service providers and environment components are located locally and are maintained by the entity 502. Alternatively, in another embodiment, the storage location(s) 524, the information management service 518 and/or the other service providers and environment components may located remotely at the site of a third party data management provider. For example, a third party data management provider may maintain a data center for managing the data of many different companies or entities.

In order to ensure that the global rules do not conflict with other rules that may be of greater importance, priority levels may be assigned to the global rules. For example, and referring again to FIG. 2, global rules 218 may be provided for defining service level objectives to be assigned to all domains within an entity. For example, one of the rules 220 may include a requirement that files larger than 2 GB should not be indexed due to the high cost of the indexing large files. In order to ensure that this rule does not trump other service mappings that are of more importance, it is assigned a low priority level of '2' (222). A conflict arises if any of the files placed in the first category 202 exceed two GB in size because category 202 is mapped to the data indexing service level objective 210. Because a conflict exists, the priority of the global rule 220 is compared to the priority of the service level mapping between the first category 202 and the service level objective 210. Because the global rule 220 only has a priority level of '2', while the service level mapping to service level objective 210 has a priority of '1', the request that 'File 4 ' be indexed takes precedence over the global rule 220.

Figure 6:
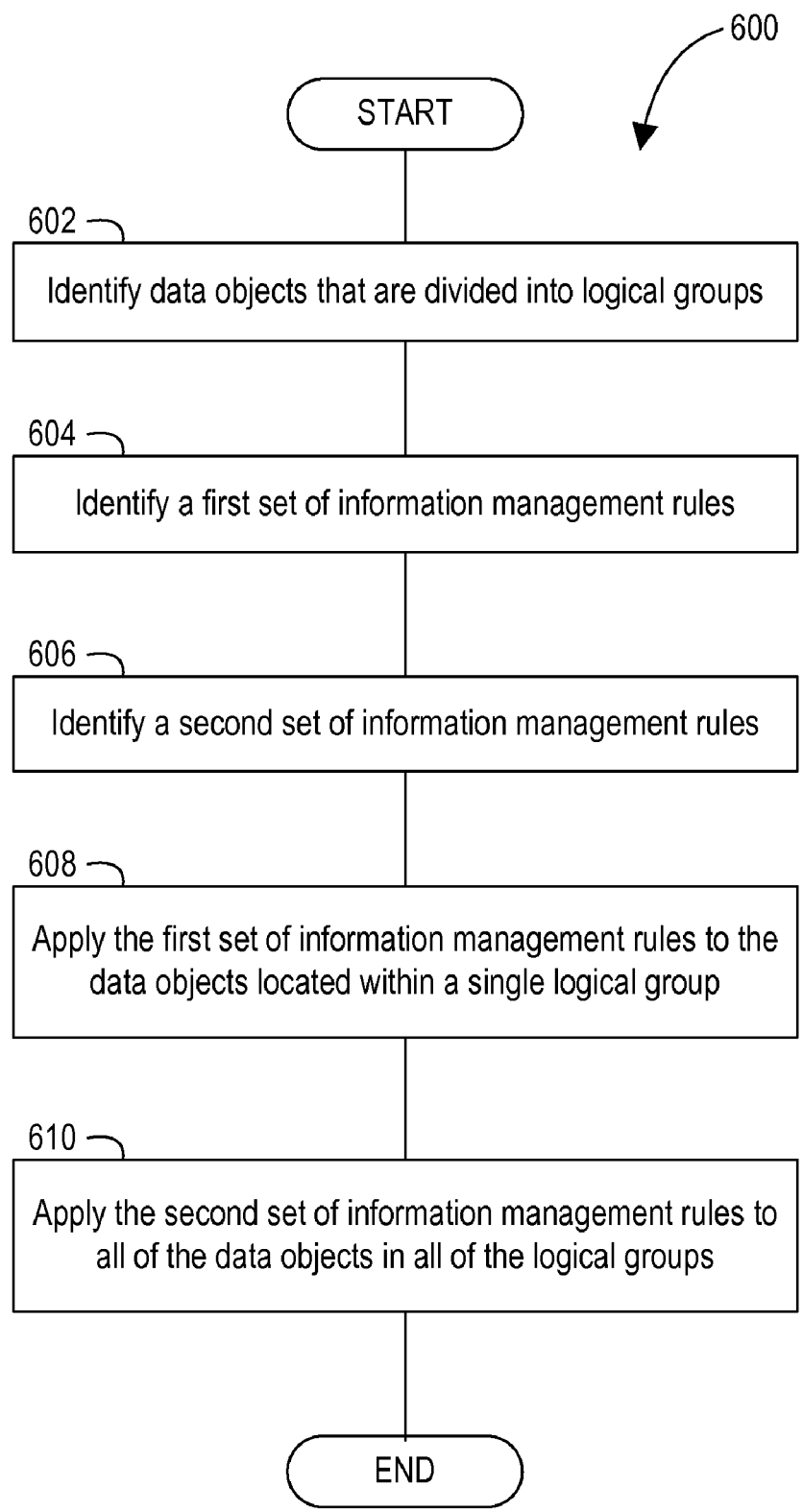
FIG. 6 illustrates a flow diagram of a method for assigning data objects to service providers capable of providing the service level objectives to data objects within a computer system on both global and local levels.

Referring now to FIG. 6, a method 600 is illustrated of for providing global and local information management services to data objects located within a computer system. The method 600 may be practiced, for example, in a computer system that includes an information management server for providing customized services to the data objects residing in the computer system. The server system may include one or more computer-readable media having computer-executable instructions, that when executed, implement the method 600.

The method 600 identifies 602 data objects that have been divided into logical groups within a computer system. The logical groups may include for example, departments, lines of business, domains, shares, and the like, within an entity.

A first set of information management rules associated with one of the logical groups is identified 604. Identifying the first set of information management rules may include, for example, receiving the rules from an administrator of the logical group associated with the first set of rules. The method 600 also identifies 606 a second set of information management rules. The identification of the second set of information management rules may include, for example, receiving the rules from a compliance officer, a security officer, an administrator for the entity controlling the data groups, a data center providing the information management services, and the like or any combination thereof.

The first set of information management rules is then applied 608 to the data objects located within the logical group associated with the first set of information management rules. The application of the first set of information management rules to the data objects defines the information management services to be provided to the data objects located in the logical group associated with the first set rules. The second set of information management rules is also applied 610 to all of the data objects in all of the logical groups. The application of the second set of information management rules to all of the data objects defines the information management services to be provided to all of the data objects located in the computer system.

The management services provided to the data objects may include, for example, the service level objectives associated with the data objects, the service providers that will provide the requested service level objectives to the data objects, the storage location wherein the data objects will be stored, and the like or any combination thereof.

Figure 7:
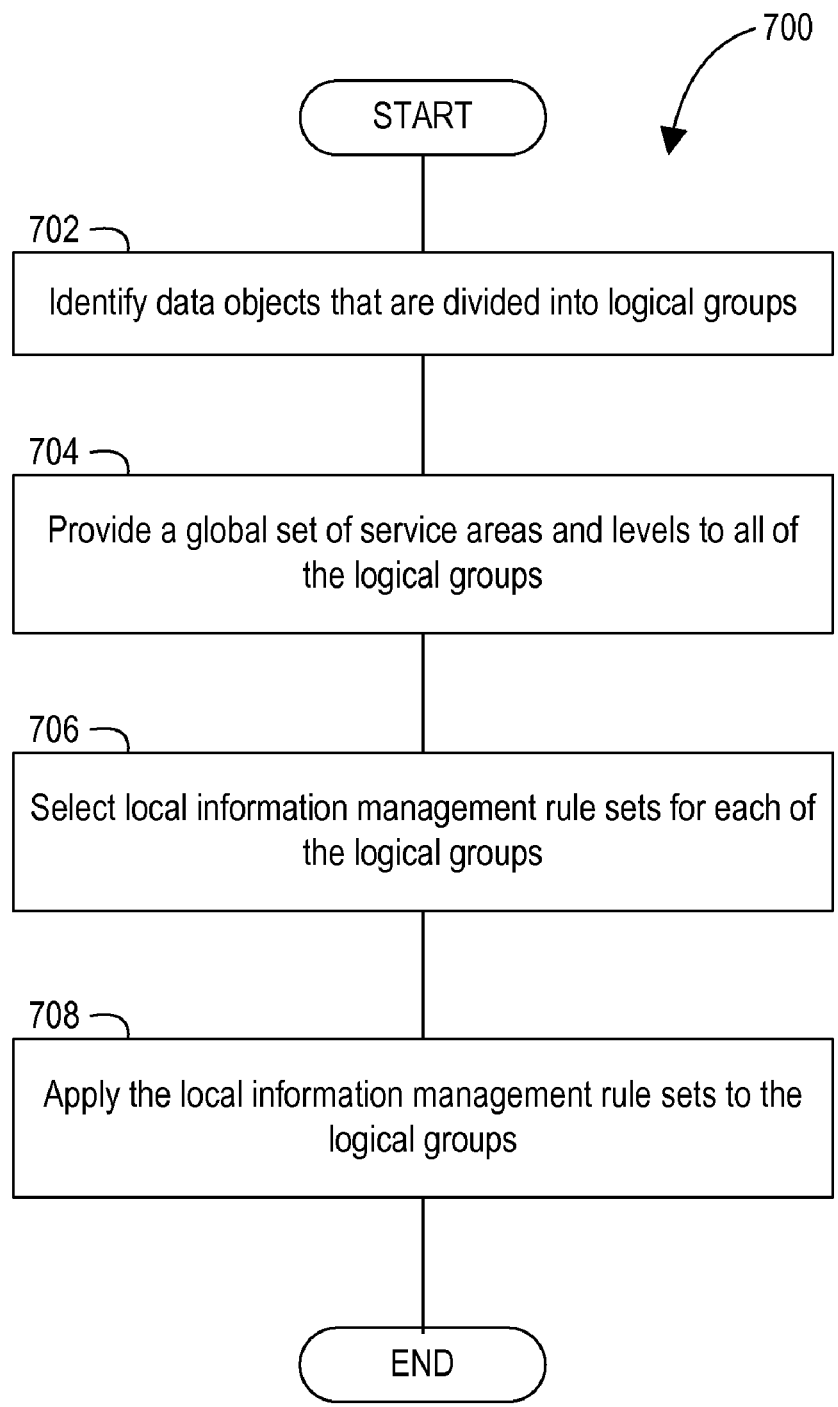
FIG. 7 illustrates a flow diagram of a method for providing information management services on a global level and service level objectives on a local level.

Referring now to FIG. 7, a method 700 is illustrated of providing information management services on a global level and service level objectives on a local level. The method 700 may be practiced, for example, at an information management server for providing customized services. The server system may include one or more computer-readable media having computer-executable instructions, that when executed, implement the method 700.

The method 700 identifies 702 data objects that have been divided into logical groups. As described previously, the logical groups may include, for example, departments, lines of business, domains, shares, and the like, within an entity. The information management server provides 704 all of the logical groups with a global set of service areas and levels. The global set of service areas and levels may specify the services that are offered by a central data center.

Although the service areas and levels offered by the information management server are global in nature, each logical group may select 706 a unique local information management rules set, which contains service level objectives that will be requested by the logical groups. Each local information management rule set may include a subset of the global service areas and levels that are offered by the information management server. The local information management rule sets requested by each logical group can be independent from one another, even though the service areas and levels that are offered by the information management server are the same for all logical groups.

The local information management rule sets are then applied 708 to the logical groups associated with the information management rule sets. In the event that a local information management rule set contains service level objectives that conflict with one another or that are not offered by the global set of service areas and levels, the requested service level objectives may be prioritized, as described previously, in order to satisfy the service level objectives that are of greatest importance.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system that includes an information management server for providing customized services to data objects residing in the computer system, a computer-implemented method for assigning information management services to the data objects on global and local levels, the computer-implemented method comprising:

identifying data objects divided into logical groups within a computer system;

identifying a first set of information management rules, the first set of information management rules associated with a first logical group included in the logical groups;

identifying a second set of information management rules;

applying the first set of information management rules to data objects located within the first logical group associated with the first set of information management rules for defining the information management services for the data objects located in the first logical group, including:

identifying a target service package for the first logical group by mapping the first logical group to at least one service level objective that identifies a service and a service level to provide for the data objects located in the first logical group; and mapping the target service package to an available service package provided by the computer system; and applying the second set of information management rules to all of the data objects in all of the logical groups for defining the information management services for all of the data objects;

wherein the target service package is associated with one or more data objects located within the first logical group and comprises one or more service level objectives, each service level objective associated with a priority level for resolving conflict with the second set of information management rules.

2. The computer-implemented method as recited in claim 1, wherein the information management services include a service level objective associated with the data objects.

3. The computer-implemented method as recited in claim 2, wherein the information management services further include a service provider for providing the service level objective to the data objects.

4. The computer-implemented method as recited in claim 3, wherein the service provider includes at least one of a file server, a retention server, a backup server, a database, and an application.

5. The computer-implemented method as recited in claim 1, wherein the information management services include a storage location wherein the data objects will be stored.

6. The computer-implemented method as recited in claim 1, wherein the information management services include information and environment classification guidelines for categorizing the data objects and environment components.

7. The computer-implemented method as recited in claim 1, wherein identifying the first set of information management rules further includes receiving the first set of information management rules from an administrator for the first logical group, the data objects located within the first logical group comprising a subset of the data objects residing in the computer system.

8. The computer-implemented method as recited in claim 1, wherein identifying the second set of information management rules further includes receiving the second set of information management rules from at least one of a compliance officer, a security officer, an administrator for all of the logical groups, and a data center providing the information management services.

9. A computer-implemented method of providing information management services on a global level and service level objectives on a local level, the computer-implemented method comprising:

identifying data objects divided into logical groups;

providing a global set of service areas and levels to all of the logical groups;

identifying a plurality of local information management rule sets containing service level objectives, each of the local information management rule sets associated with one of the logical groups and being selected independently from each other; and applying the plurality of local information management rule sets to the logical groups associated with the information management rule sets, including, for each logical group:

identifying a target service package for the logical group by mapping the logical group to at least one service level objective that identifies a service and a service level to provide for the logical group; and mapping the target service package to an available service package provided by a computer system in which the logical groups are included;

wherein the target service package for each logical group is associated with one or more data objects located within the logical group and comprises one or more service level objectives, each service level objective associated with a priority level for resolving conflict with the global set of service areas and levels.

10. The computer-implemented method as recited in claim 9, wherein the global set of service areas and levels are provided by a data center having at least one service provider and configured to provide information management services to at least one end user.

11. The computer-implemented method as recited in claim 10, wherein the global set of service areas and levels define the services that the data center is capable of providing to the at least one end user.

12. The computer-implemented method as recited in claim 9, wherein the plurality of local information management rule sets include information and environment classification guidelines for categorizing the data objects within each of the logical groups.

13. A computer program product for use in a computer system that includes an information management server for managing customized services for data objects residing in the computer system, the computer program product used in implementing a method of assigning information management services to the data objects on global and local levels, the computer program product comprising one or more computer readable media having stored thereon computer executable instructions that, when executed by one or more processors, cause the computer system to perform the following:
   identify data objects divided into logical groups within a computer system;
   identify a first set of information management rules from a first source, the first set of information management rules associated with a first logical group included in the logical groups;
   identify a second set of information management rules from a second source;
   apply the first set of information management rules to the data objects located within the first logical group associated with the first set of information management rules for defining the information management services for the data objects located in the first logical group, including:
      identify a target service package for the first logical group by mapping the first logical group to at least one service level objective that identifies a service and a service level to provide for the data objects located in the first logical group; and
      map the target service package to an available service package provided by the computer system; and
   apply the second set of information management rules to all of the data objects in all of the logical groups for defining the information management services for all of the data objects;
   wherein the target service package is associated with one or more data objects located within the first logical group and comprises one or more service level objectives, each service level objective associated with a priority level for resolving conflict with the second set of information management rules.

14. The method as recited in claim 13, wherein the information management services include a service level objective associated with the data objects.

15. The method as recited in claim 14, wherein the information management services further include a service provider for providing the service level objective to the data objects.

16. The method as recited in claim 15, wherein the service provider includes at least one of a file server, a retention server, a backup server, a database, and an application.

17. The method as recited in claim 13, wherein the information management services include a storage location wherein the data objects will be stored.

18. The method as recited in claim 13, wherein the information management services include information and environment classification guidelines for categorizing the data objects and environment components.

19. The method as recited in claim 13, wherein the computer executable instructions that are configured to identify the first set of information management rules further include instructions configured to:
   receive the first set of information management rules from an administrator for the first logical group, the data objects located within the first logical group comprising a subset of the data objects residing in the computer system.

20. The method as recited in claim 13, wherein the computer executable instructions that are configured to identify the second set of information management rules further include instructions configured to:
   receive the second set of information management rules from at least one of a compliance officer, a security officer, an administrator for all of the logical groups, and a data center providing the information management services.

* * * * *